United States Patent [19]

Kitazume

[11] Patent Number: 4,896,964

[45] Date of Patent: Jan. 30, 1990

[54] SYSTEM FOR MEASURING IRREGULARITIES OF ROAD SURFACE

[75] Inventor: Masahiro Kitazume, Tokyo, Japan

[73] Assignee: Tokyo Keiki Co., Ltd., Tokyo, Japan

[21] Appl. No.: 103,286

[22] Filed: Oct. 1, 1987

[30] Foreign Application Priority Data

Oct. 10, 1986 [JP] Japan .................. 61-240245

[51] Int. Cl.$^4$ .............................. G01B 11/30
[52] U.S. Cl. ......................... 356/376; 73/146
[58] Field of Search ............. 356/1, 5, 376; 73/146

[56] References Cited

U.S. PATENT DOCUMENTS

| | | | |
|---|---|---|---|
| 3,649,123 | 3/1972 | Ulicki | 356/5 |
| 4,632,543 | 12/1986 | Endo | 356/5 |
| 4,653,316 | 3/1987 | Fukahara | 356/376 |
| 4,658,639 | 4/1987 | Arnberg | 73/146 |
| 4,685,806 | 8/1987 | Arnberg | 356/376 |

FOREIGN PATENT DOCUMENTS 7514839 12/1976 France .................. 73/146

Primary Examiner—Richard A. Rosenberger
Attorney, Agent, or Firm—Sandler & Greenblum

[57] ABSTRACT

A system for measuring irregularities of a road surface, wherein laser rays irradiated on the road surface are received and processed in a predetermined manner. This system includes a body frame mounted on the road surface, a movable frame movably supported by this body frame, and a laser ray transmitting-receiving section connected to this movable frame. The laser ray transmitting-receiving section is additionally provided thereon with a signal process circuit, by which received signals are processed in a predetermined manner, whereby the irregularities of the road surface are measured. Processing performed in the signal process circuit is controlled in timing in accordance with a moving speed of the laser ray transmitting-receiving section.

14 Claims, 5 Drawing Sheets

4,896,964

SYSTEM FOR MEASURING IRREGULARITIES OF ROAD SURFACE

BACKGROUND OF THE INVENTION

1. Field of the Invention

This invention relates to a system for measuring irregularities of a road surface, and more particularly to a system for measuring irregularities of a road surface using laser rays.

2. Description of the Prior Art

FIG. 6 shows a conventional example which includes a body frame 1 that is stoppingly; provided on a road surface E during measuring, a slide frame 2 that is reciprocatorily movable to the left or right (in the drawing) along the body frame 1, roller-type measuring means 3 that is mounted on the slide frame 2, and an encoder 4 for sensing a vertically moving value (i.e., a change in h) of the roller-type measuring means 3 for directly measuring the irregularities of the road surface by moving the roller-type measuring means 3 in a direction A or B in the drawing.

The conventional example described above is of such an arrangement that, since rollers 3A constituting a sensor section of the roller-type measuring means 3 are brought into contact with the road surface and rotatably movable, it is impossible to perform measuring at high speed, and, in switching from one direction over to another, such problems have been presented that, the roller-type measuring means 3 should be operated, the body frame as a whole should be rearranged to the opposite direction and so on, whereby much labor is taken, abrupt changes in irregularities cannot be followed up in many cases, and further, the measuring accuracy is so limited that the measuring accuracy is directly affected by the diameter of the rollers.

SUMMARY OF THE INVENTION

The present invention has been developed to obviate the above-described disadvantages of the prior art and has as its object the provision of a system for measuring irregularities of a road surface it is wherein, possible to take measurements at high speed and wherein, general irregularities can be reliably detected with high accuracy.

To achieve the above-described object, the present invention contemplates an arrangement that includes: a laser ray transmitting-receiving section that is opposed to the road surface; a body frame for holding the laser ray transmitting-receiving section at a predetermined height above the road surface; and a carrier means mounted on the body frame for moving the laser ray transmitting-receiving section along the body frame from one end to the other, the laser ray transmitting-receiving section being additionally provided thereon with an exciting circuit section for energizing the continuous operation of a predetermined laser outputting section and a signal process circuit section for receiving reflected and diffused rays from the road surface and detecting predetermined irregularities information; whereby the number of times of signal processing per unit time of received signals in the signal process circuit is changed in synchronism with a moving speed of the laser ray transmitting-receiving section on the body frame.

DETAILED DESCRIPTION OF THE PREFERRED EMBODIMENT

One embodiment of the present invention will hereunder be described with reference to FIGS. 1 to 3.

Figure 1:
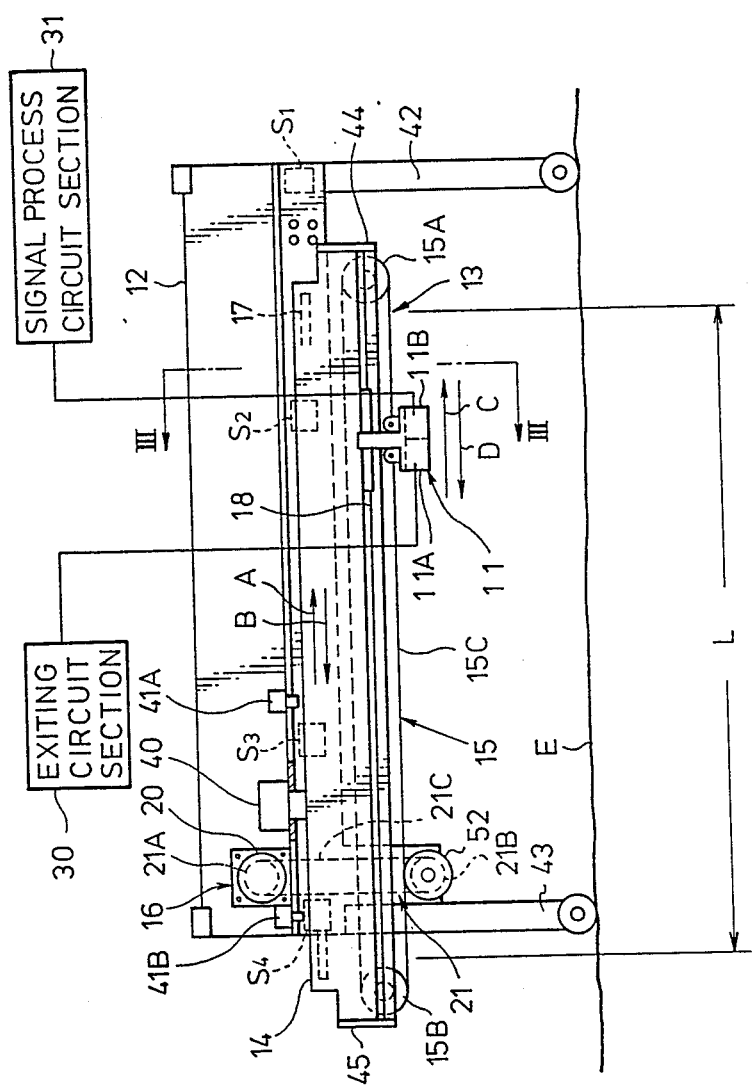
FIG. 1 is a front view showing a first embodiment of the present invention.

FIG. 1, shows a road surface which is designated as E, a laser ray transmitting-receiving section 11 and a body frame 12 which extends from left to right.

In this embodiment, the laser ray transmitting-receiving section 11 is divided into a laser ray transmitting portion 11A, comprising a laser diode and the like, and a laser ray receiving portion 11B, comprising by a one-dimensional CCD sensor and the like. As shown in FIG. 1, the laser ray transmitting-receiving section 11 is opposed to the road surface E and is mounted to the body frame 12 by a slide frame 14, comprising part of a carrier means 13.

Similarly to the body frame 12, the carrier means 13 includes the slide frame 14, which extends from left to right, as shown in FIG. 1, a carrier chain mechanism 15 mounted on the slide frame 14, and driving means 16 for driving the carrier chain mechanism 15.

The slide frame 14 engages the body frame 12 through a first guide means 17 and is supported thereby. The first guide means 17 is provided along the body frame 12. Thus, the slide frame 14 is constructed as to be reciprocatorily movable along the body frame 12 in a direction A or B, as shown in FIG. 1.

The slide frame 14 is mounted to the body frame 12 with the laser ray transmitting-receiving section 11 attached to a second guide means 18. The second guide means 18 is provided along the slide frame 14. Thus, the laser ray transmitting-receiving section 11 is constructed so as to be reciprocatorily movable along the slide frame 14 in a direction C or D. As described above, the laser ray transmitting-receiving section 11 is supported by the slide frame 14 and is engaged with the carrier chain mechanism 15. As will be described hereunder, the laser ray transmitting-receiving section 11, being biased by the carrier chain mechanism 15, moves on the slide frame 14.

The driving means 16 for driving the carrier chain mechanism 15 on the slide frame 14 comprises a driving motor 20 that is mounted on the body frame 12 and a driving chain mechanism 21 for imparting a turning force of the driving motor 20 to the carrier chain mechanism 15, as shown in FIG. 1. The driving chain mechanism 21 is mounted on the body frame 12 and extends downward in the drawing. For this, the driving chain mechanism 21 and the driving motor 20 are always operable at predetermined positions.

The laser ray transmitting section 11A of the laser ray transmitting-receiving section 11 is additionally provided with an exciting circuit section 30 for continuously outputting laser rays of a predetermined level similarly, the laser ray receiving section 11B is provided with a signal process circuit section 31 for detecting the information of irregularities of the road surface E from the received laser rays and processing the same.

Figure 2:
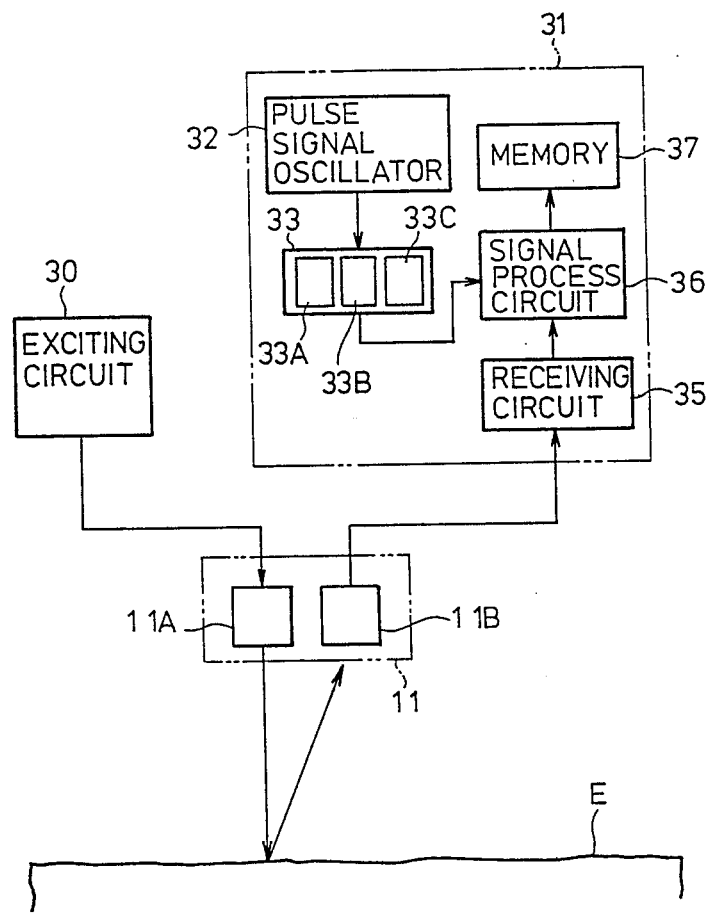
FIG. 2 is a block diagram showing an example of a circuit portion connected to the laser ray transmitting-receiving section used in the embodiment shown in FIG. 1.

As shown in FIG. 2, the signal process circuit section 31 includes a pulse signal oscillator 32 and a frequency divider 33.

The pulse signal oscillator 32 has a construction whereby the number of repeated times of timing signals, which are signals outputted therefrom, is regulated by an encoder (that is energized by the driving motor 20) to be described hereunder. Furthermore, in this embodiment, the frequency divider 33 comprises a plurality of frequency dividers 33A, 33B and 33C which are switchingly usable, as necessary.

The signal process circuit section 31 further includes a receiving circuit 35, a signal process circuit 36 and a memory 37. The signal process circuit 36 functions in such a manner that it receives an input from the frequency divider 33, so that it operates in synchronism with the signal from the frequency divider 33, detects predetermined distance information and information of irregularities, and stores the same in a memory 37.

Braking means 40 is fixedly mounted on the body frame 12, and normally functions to slowly apply a braking force to the slide frame 14. In measuring the irregularities of an inclined surface for example, the braking means 40 serves to prevent the slide frame 14 from freely sliding downward. Sensors 41A and 41B constantly detect the presence of the slide frame 14. When the braking means 40 is energized by the outputs from the sensors 41A and 41B, the slide frame 14 is stopped from moving. Legs 42 and 43 are mounted on the body frame 12. Furthermore, stoppers 44 and 45 for engagingly stopping the laser ray transmitting-receiving section 11 from moving are, provided.

Figure 3:
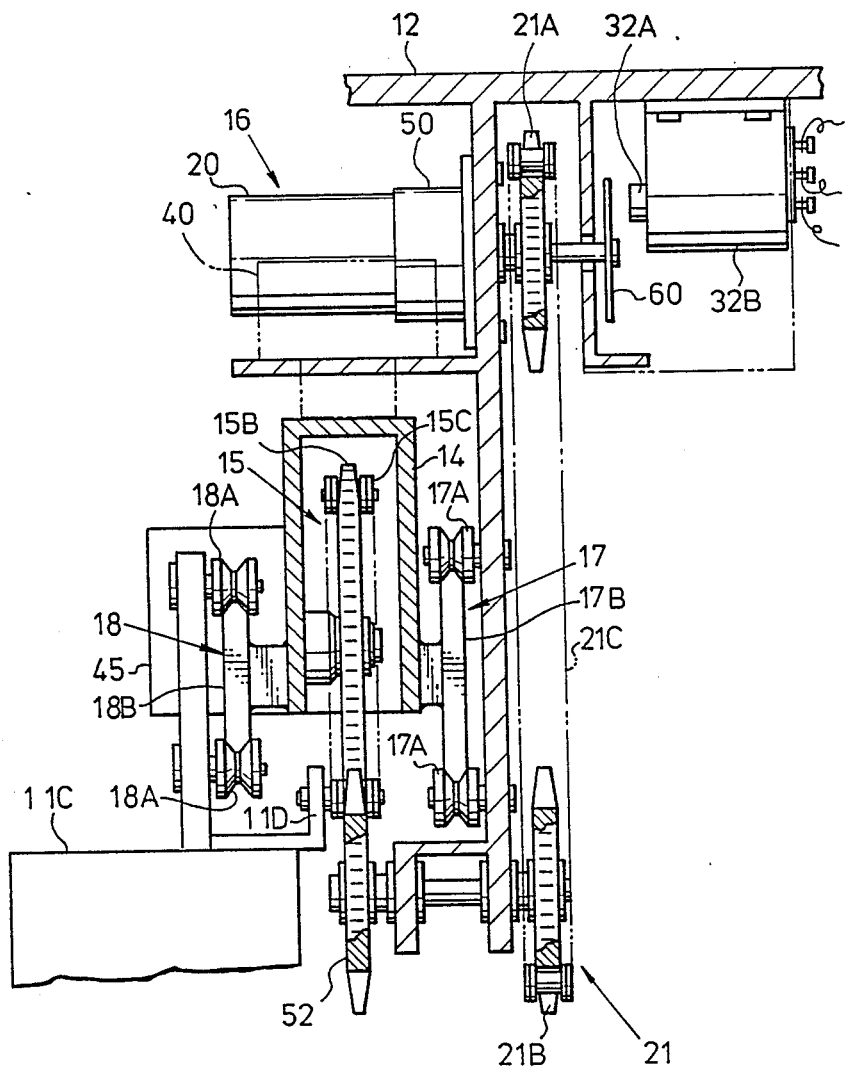
FIG. 3 is a partially omitted sectional view taken along the line III—III in FIG. 1.

The above-described carrier chain mechanism 15, driving means 16 and the like are described further in detail with reference to FIGS. 1 and 3.

As shown in FIG. 1, the carrier chain mechanism 15 comprises by chain wheels 15A and 15B, which are mounted on the slide frame 14, and a carrier chain 15C which is stretched across the chain wheels 15A and 15B. As shown in FIG. 3, in this embodiment, the slide frame 14 is formed into a box shape which is downwardly open, and the chain wheels 15A and 15B are rotatably mounted at opposite end portions in the slide frame 14, as shown in FIG. 1.

Mounted on opposite side surfaces of the slide frame 14 (shown in FIG. 3) are the aforesaid first and second guide means 17 and 18, respectively.

The first and second guide means 17 and 18, as actually shown in FIG. 3, comprise guide rails 17B and 18B which are parallelly fixed to opposite side surfaces of the slide frame 14 at regular intervals therefrom and a set of four engaging rollers 17A, 17A, 18A, 18A, which are engaged with the top and bottom ends of the guide rails 17B and 18B. While only two sets of rollers are disclosed in FIG. 3, additional rollers can be included. In the present embodiment, the set of four engaging rollers 17A, 17A, ... on one hand, are mounted at four positions S1, S2, S3 and S4 on the body frame 14, as shown in FIG. 1, so that the rollers 17A, 17A, ... can engage and guide the slide frame 14 at two or more positions during the moving of the slide frame 14. Furthermore, the set of four engaging rollers 18A, 18A, ... on the other hand are rotatably mounted to a case portion 11C of the laser ray transmitting-receiving section 11, as shown in FIG. 3.

The driving means 16 comprises the motor 20 mounted thereon with a reduction gear mechanism 50, the driving chain mechanism 21 engaging with an output shaft on the driving chain mechanism 21 and a driving chain wheel 52 connected to the driving chain mechanism 21. The driving chain mechanism 21 comprises two chain wheels 21A and 21B, and a driving chain 21C stretched across the chain wheels 21A and 21B. As shown in FIG. 3, the chain wheel 21B is coaxially mounted thereon with the driving chain wheel 52, which is driven by the carrier chain mechanism 15. As shown in FIG. 3, the case portion 11C of the laser ray transmitting-receiving section 11 is engaged through a connecting portion 11D with the carrier chain 15C of this carrier chain mechanism 15.

Coupled onto an output shaft of the reduction gear mechanism 50 is an encoder 60 for regulating the repeat times of the pulse signals outputted from the pulse signal oscillator 32. Sensor portion 32 of the pulse signal oscillator 32, receives a predetermined signal from the encoder 60, while a case portion 32 stores the pulse signal oscillator 32.

A general description of the operation of the above embodiment will hereunder be described.

First, in a normal state, the braking means 40 moderately engages the slide frame 14, whereby the slide frame 14 is stopped in movement. When the driving means 16 is actuated and the carrier chain 15C is rotated for running to the left, as shown in FIG. 1, the laser ray transmitting-receiving section 11 together with the carrier chain 15C integrally move in the direction C. Here, even when the laser ray transmitting-receiving section 11 comes into abutting contact with stopper 44 on the slide frame 14, the driving means 16 does not stop at all. When the laser ray transmitting-receiving section 11 comes into abutting contact with the stopper 44, thereupon, the slide frame 14 moves integrally with the laser ray transmitting-receiving section 11 to the right in FIG. 1 when the latter moves.

When the left end portion of the slide frame 14, as shown in FIG. 1, moves to the right beyond position sensor 41B, the braking means 40, upon receiving the information, is immediately actuated to release the motor 20 from the power source and stop the slide frame's 14 movement.

Subsequently, a control means, not shown, is operated to reverse the rotation of the motor 20 (by this operation, the braking means 40 is simultaneously released from a completely stopped operation of the slide frame 14). In this case, the laser ray transmitting-receiving section 11 positioned at the right end portion, as shown in FIG. 1, moves being to the left in the direction D.

On the other hand, the slide frame 14 does not move due to the moderate engaging action by the braking means 40. The laser ray transmitting-receiving section 11 moves in the direction D until it comes into abutting contact with the stopper 45 mounted at the left end portion of the slide frame 14, as shown in FIG. 1. The laser ray transmitting-receiving section 11, which has come into abutting contact with the stopper 45, moves together with the slide frame 14 to the left in the drawing. Then, when the right end portion of the slide frame 14 in FIG. 1 moves to the left beyond the position sensor 41A, the braking means 40, upon receiving the information, immediately releases the motor 20 from the power source and stops movement of the slide frame 14.

Hereinafter, operations similar to the above are performed, whereby, in the laser ray transmitting-receiving section 11, the operations similar to the above are repeatedly performed, during which irregularities of the road surface can be effectively measured.

In this embodiment, it is possible to measure the irregularities of the road surface as large as a distance covering the movement of the slide frame 14 on the body frame 12 (in this embodiment, this distance is substantially equal to the distance of a protrusion of the slide frame 14 from the body frame 12) in addition to a moving distance L of the laser ray transmitting-receiving section 11 on the slide frame 14.

When the moving speed of the laser ray transmitting-receiving section 11 is constant, the pulse signal oscillator 32 outputs pulse signals by repeating cycles predetermined by the encoder 60 and the frequency divider 33. The signal process circuit 36 is actuated in association with the repeating cycles of the pulse signals, to thereby process input signals and deliver the same into the memory 37. The repeating cycles of the measured data written into the memory 37 are constant. On the other hand, when the RPM of the driving motor 20 is raised to increase the moving speed of the laser ray transmitting-receiving section 11, the RPM of the encoder 60 is increased in proportion thereto, whereby the value of information written into the memory 37 is increased as well. For this, it is so advantageous that, even if the irregularities of the road surface are measured at high speed, pitches of distance on the road surface is completely equal to those in the case where the measuring is performed at low speed, so that it becomes possible to perform the measuring at high speed without changing the measuring accuracy. Furthermore, the frequency divider can be suitably switched to change the interval between the measuring times, and this respect is preferable when irregularities of a bottom face is measured in excavating over a large area in case of construction works and the like.

Figure 4:
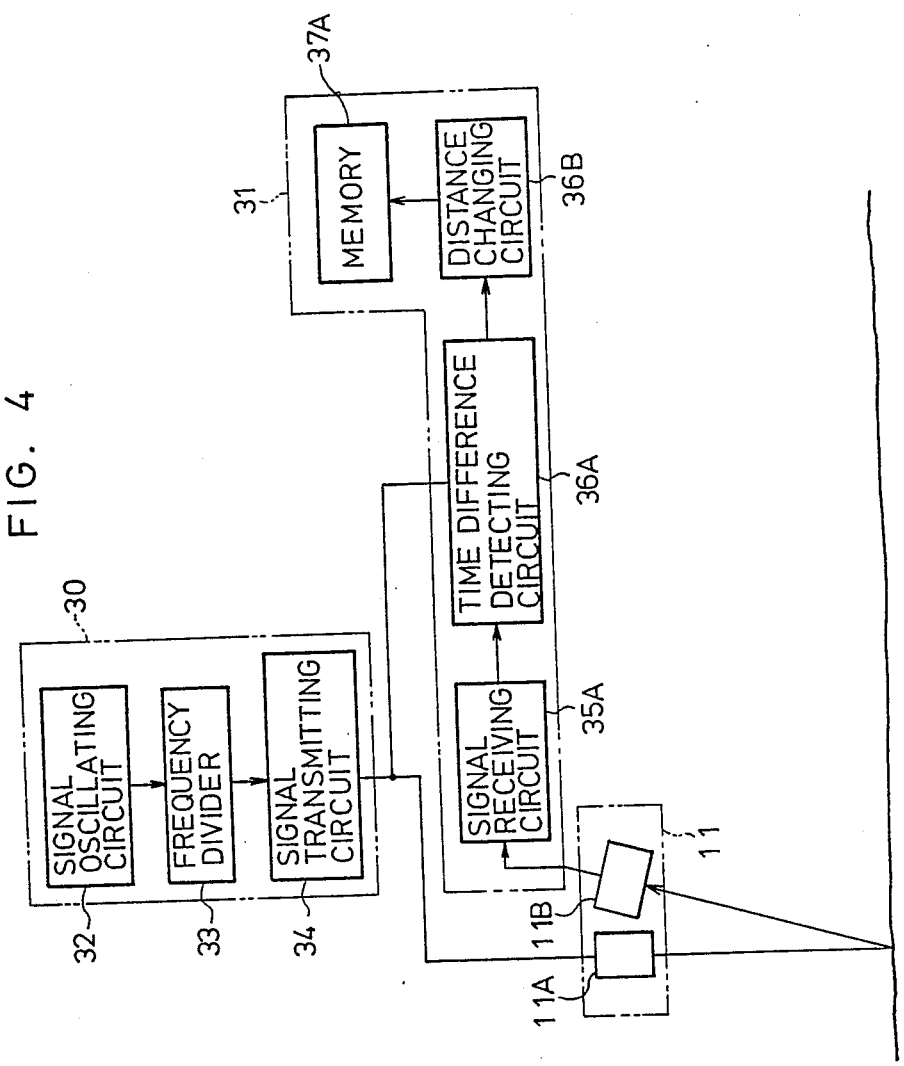
FIG. 4 is a block diagram showing another example of the a circuit portion connected to the laser ray transmitting-receiving section.

FIG. 4 shows another example of the signal process system. In this example, an output from a transmitting circuit 34 is delivered to the laser ray transmitting portion 11A, where pulse-like laser rays are outputted. The output from the transmitting circuit 34 is simultaneously delivered to a time difference detecting circuit 36A on the side of the receiving circuit, whereby a time difference between the pulse-like laser ray and received signal delivered from the receiving circuit 35A is detected. Thereafter, the time difference is changed converted to a distance by a distance change circuit 36B and stored in the memory 37.

Other aspects of the arrangement are similar to those in FIG. 2.

This example can offer advantages in that, even with this arrangement, substantially the same results as in FIG. 2 are obtainable, and the idea based on the time difference leads to the detection of irregularities of the road surface without being affected by increases or decreases of the sensitivity.

In the above embodiment, there is exemplified a case where the laser ray transmitting portion 11A and the laser ray receiving portion 11B of the laser ray transmitting-receiving section 11 are arranged in a plane that is parallel to the moving direction of the laser ray transmitting-receiving section 11. However, the portions 11A and 11B may be arranged in a plane that perpendicularly intersects the moving direction of the laser ray transmitting-receiving section 11.

Figure 5:
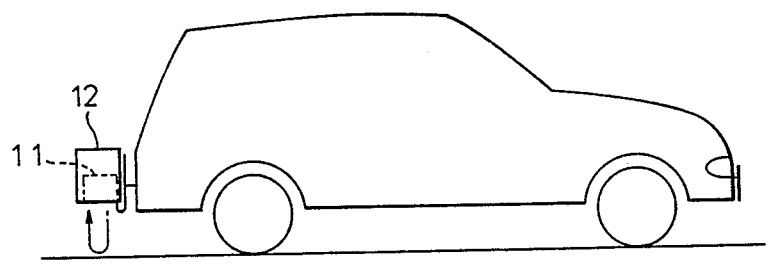
FIG. 5 is an explanatory side view showing an example of the application of the present invention.
Figure 6:
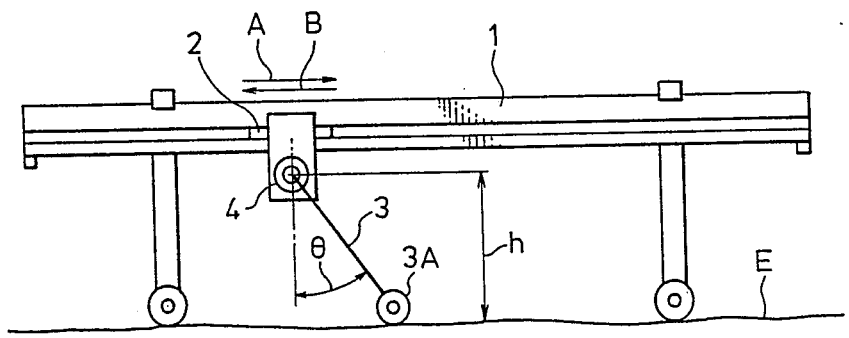
FIG. 6 is an arrangement showing a conventional example.

In the above embodiment, there is particularly exemplified a case where the body frame 12 is mounted on the road surface E through legs 42 and 43. However, the present invention need not necessarily be limited to this, and the legs 42 and 43, as shown in FIG. 1, can be removed and the body frame 12 be mounted on a motor vehicle, as shown in FIG. 5. The above arrangement can offer the advantage of quickly coping with the movement of the measuring position.

The present invention can be applied to measuring the irregularities of a surface of the earth other than the road surface as it is.

The present invention, being arranged and functioning as described above, can provide an outstanding system for measuring irregularities of a road surface, which has not been seen in the past, wherein it becomes possible to measure information of irregularities of the road surface and changes thereof with high accuracy and at high speed by its arrangement of continuously measuring the road surface by the use of laser rays. Accordingly, the measuring work can be facilitated, and, adverse influences due to temperature and humidity in a measuring region can be eliminated.

What is claimed is:

1. A system for measuring irregularities of a road surface by the use of laser rays, comprising:
   (a) a laser ray transmitting and receiving section positioned above said road surface;
   (b) a body frame for holding said laser ray transmitting and receiving section at a predetermined height; and
   (c) carrier means mounted on said body frame for moving said laser ray transmitting and receiving section along said body frame from one end to the other, said laser ray transmitting and receiving section being operatively connected to an exciting circuit section for energizing the continuous operation of said laser ray transmitting section, said laser ray transmitting and receiving section being operatively connected to a signal process circuit section for receiving reflected and diffused rays from said road surface, and detecting irregularities information, said signal process circuit section comprising:
   (i) means for producing pulse signals at a predetermined timing;
   (ii) a plurality of frequency dividers for receiving said pulse signals;
   (iii) means for selecting one of said frequency dividers to obtain a desired output signal;
   (iv) means for receiving a signal from said laser ray receiving section; and
   (v) a signal process circuit for receiving a signal from said receiving means to determine distance information and irregularities information, said signal process circuit being actuated in synchronism with said output signals from said selected frequency divider;
   whereby the number of times of signal processing per unit time to received signals in said signal process circuit is changed in synchronism with a moving speed of said laser ray transmitting and receiving section on said body frame.

2. The system for measuring irregularities of a road surface as recited in claim 1, wherein said frequency dividers perform timing regulation of said signal process circuit through an encoder and said encoder is connected to a driving source of said carrier means to be rotatably driven.

3. The system for measuring irregularities of a road surface as recited in claim 1, wherein said carrier means comprises;
a frame that is movable on said body frame in a direction that is parallel to the road surface;
a chain mechanism for moving said movable frame; and
means for driving said chain mechanism.

4. The system for measuring irregularities of a road surface as recited in claim 3, wherein said laser ray transmitting and receiving section is relatively movably connected to said movable frame.

5. The system for measuring irregularities of a road surface as recited in claim 3, wherein said laser ray transmitting and receiving section is relatively movably connected to said movable frame, and said movable frame is provided thereon with means for regulating a range of movement of said laser ray transmitting and receiving section relative to said movable frame.

6. The system for measuring irregularities of a road surface as recited in claim 5, wherein said laser ray transmitting and receiving section is movable a predetermined distance together with said movable frame in a state of being engaged with said movable range regulating means.

7. The system for measuring irregularities of a road surface as recited in claim 3, wherein said chain mechanism includes a pair of gears rotatably supported by said movable frame and a chain endlessly guided around said gears and wherein said laser ray transmitting and receiving section is connected to a portion of said chain.

8. A system for measuring irregularities of a road surface comprising:
(a) a laser ray transmitting-receiving section including a laser receiving portion which provides an output indicative of a point of impingement of said laser ray;
(b) means for moving said laser ray transmitting-receiving section at a predetermined height over said road surface at a measurable speed; and
(c) means for processing at variable intervals signals from said laser ray receiving portion to obtain at least one value from which changes in the height of said road surface may be calculated, said processing means comprising:
(i) means for producing pulse signals at a predetermined timing;
(ii) a plurality of frequency dividers for receiving said pulse signals;
(iii) means for selecting one of said frequency dividers to obtain a desired output signal;
(iv) means for receiving a signal from said laser ray receiving portion; and
(v) a signal process circuit for receiving a signal from said receiving means and said signal from said selected frequency divider to determine distance information and irregularities information.

9. The system as recited in claim 8, wherein said signal process circuit alters said variable interval based on the speed of movement of said laser ray transmitting-receiving section on said moving means.

10. The system as recited in claim 8, wherein said the number of times of signal processing per unit time to received signals in said signal processing circuit is changed in synchronism with said moving speed of said laser ray transmitting-receiving section.

11. The system as recited in claim 10, wherein said moving means comprises:
a body frame;
a movable frame movably mounted on said body frame, said movable frame having said laser ray transmitting-receiving section movably mounted thereon so that movement of said movable frame causes movement of said laser ray transmitting-receiving section in a direction parallel to said road surface; and
controllable means for moving said movable frame.

12. The system as recited in claim 11, wherein said laser ray transmitting-receiving section is movably mounted on said movable frame and, further, wherein said system further comprises
means for imposing limits on the amount of travel of said integral laser ray transmitting-receiving section with respect to said movable frame.

13. The system as recited in claim 12, wherein said laser ray transmitting-receiving section may engage said means for imposing so that said laser ray transmitting-receiving section and said movable frame may move together.

14. The system as recited in claim 13 further comprising means for detecting a time difference between the inputting of a laser ray output signal and the receiving of said laser ray receiving signal.

* * * * *

UNITED STATES PATENT AND TRADEMARK OFFICE
CERTIFICATE OF CORRECTION

PATENT NO. : 4,896,964

DATED : Jan. 30, 1990

INVENTOR(S) : M. KITAZUME

It is certified that error appears in the above-identified patent and that said Letters Patent is hereby corrected as shown below:

```
    Column 1, line 14, delete ";" after "stoppingly";
    Column 1, line 44, change "it is wherein," to ---,wherein
it is---;
    Column 2, line 29, delete "by" before "a";
    Column 2, line 37, change "as" to ---(as---;
    Column 2, line 37, change "1" to ---1)---;
    Column 3, lines 4 and 5, change "level similarly" to ---
-level. Similarly---;
    Column 3, line 40, delete "," after "are";
    Column 3, line 45, delete "by";
    Column 4, line 24, change "32" to ---32A---  (second
occurrence);
    Column 4, line 26, change "32" to ---32B---;
    Column 4, line 57, delete "being"; and
    Column 5, line 53, delete "changed".
```

Signed and Sealed this

Thirtieth Day of July, 1991

*Attest:*

HARRY F. MANBECK, JR.

*Attesting Officer*     *Commissioner of Patents and Trademarks*